June 30, 1959  W. ZIMMERMANN ET AL  2,892,265
COOLING OF HOT MATERIALS
Filed Feb. 13, 1956  7 Sheets-Sheet 1

Fig. 1

Inventor:
WILHELM ZIMMERMANN
HELMUT WENDEBORN
By Bailey, Stephens and Huettig
ATTORNEYS

June 30, 1959 W. ZIMMERMANN ET AL 2,892,265
COOLING OF HOT MATERIALS
Filed Feb. 13, 1956 7 Sheets-Sheet 4

United States Patent Office 2,892,265
Patented June 30, 1959

2,892,265
COOLING OF HOT MATERIALS

Wilhelm Zimmermann, Frankfurt am Main, and Helmut Wendeborn, Bad Homburg vor der Hohe, Germany, assignors to Metallgesellschaft Aktiengesellschaft, Frankfurt am Main, Germany Application February 13, 1956, Serial No. 565,254

Claims priority, application Germany March 29, 1952

11 Claims. (Cl. 34—187)

This invention relates to the cooling of hot, sintered, agglomerated materials. In particular, the invention is directed to the cooling of hot, lumpy materials such as oxidized or sulfatized sintered ores.

Ordinarily hot lumpy materials are cooled by means of a water spray, or by an air blast directed upon the surface of the material. The problem is acute in the cooling of hot, lumpy materials, normally referred to as sintered materials, or agglomerated materials such as exist in sintered iron ore, aluminum ore, or to the oxidized or sulfatized sintered ores. These ores in hot lumpy condition may be in the form of a sintered cake, or as individual pellets or granules. An agglomerated material is that composed of particles cemented together to form larger particles or granules, the cementation being achieved either by the particles sticking together when heated or by the addition of some adhering substance. Ordinarily the use of an air blast directed against the surface of a layer of hot, sintered material has not been sufficiently successful to extract the heat within a feasible length of time, and consequently, a water spray has been used to cool the material. The use of a water spray results in that the hot, lumpy, sintered materials disintegrate because of the thermal stresses produced, which is objectionable inasmuch as it results in considerable dust, and renders the material in a condition difficult of further processing. Therefore, the very purpose of sintering or pelletizing to obtain large lumps of material is defeated by the use of water sprays.

This situation is not remedied by an air blast directed onto the surface of the material inasmuch as only the upper surface of the material is cooled, but not the inner parts and the quantity of air needed is far greater than can be supplied to remove the heat from the hot material within a reasonable length of time. In this connection, it is noted that the hot, lumpy material to be cooled is either in, or approaching, an incandescent state. A further disadvantage of the conventional cooling apparatus and processes lies in that the material is roughly handled on being dumped into and discharged from the cooling apparatus, which leads to further disintegration and dusting of the material. Again, the apparatus itself, which is treating materials of high density and heat, such as incandescent iron ore sinters, must be in construction, able to withstand the destructive activity of the materials, and of easy maintenance. A further process involving cooling the hot, sintered material on plates beneath which cooling water is circulated, while being partially successful, presents complicated problems in the circulation of the cooling water, while at the same time does not provide sufficient cooling action, because of the slow heat transfer between the hot, lumpy material through the plates to the cooling liquid, and thus made necessary the additional use of water sprays.

The objects of this invention are to cool hot, agglomerated or sintered material without the crushing, pulverizing, or dusting of the same, whether or not the material is in the form of pellets or granules; to produce an apparatus and process to cool hot, sintered material with air within a reasonable time: to cool hot, agglomerated material from temperatures ranging between 600 degrees to 1300 degrees C. down to a temperature of about 70 to 100 degrees C. or a handable temperature, at a rate from one thousand to four thousand tons per twenty-four hour day; to cool the hot, sintered material without incurring such thermal stresses as would break up the material or weaken the mechanical strength of the same; and to cool the material without the excessive creation or loss of dust; and to produce an apparatus of rugged construction with low maintenance cost and with low power consumption.

In general, these objects are obtained by placing the hot material on a moving conveyor, with the material being dropped from the shortest possible height so as to prevent it from breaking up. The material remains stationary upon the louvered bottom of the conveyor. This louvered bottom is so constructed as to permit the maximum passage of air through the bottom up through the hot material while at the same time providing a large support area to prevent small particles and dust from dropping through the conveyor. The quantity of air drawn through the material by forced draft is sufficient to extract the heat therefrom within 15 minutes to one-half hour. After the material is cooled, the conveyor is arranged to dump the material with a minimum fall so that again the lumpy material is not broken up or pulverized. At the time the hot, lumpy material is placed on the conveyor, it may be sifted, and the dust fines removed therefrom. This serves to open up the material so that when it is on the conveyor a free passage of air therethrough is provided, and the cooling hastened. A hood is placed over a portion of the conveyor in air seal contact therewith and provided with an exhaust stack. The natural draft in the stack is supplemented by an induced draft provided by a suction fan. Furthermore, the economical size of the conveyor can be reduced by making it circular in plan. On the other hand, a straight line conveyor, either horizontal or inclined, can be used to serve the additional function of a transporting means.

The means by which the objects of the invention are obtained are described more fully with reference to the accompanying schematic drawings, in which.

Figure 1:
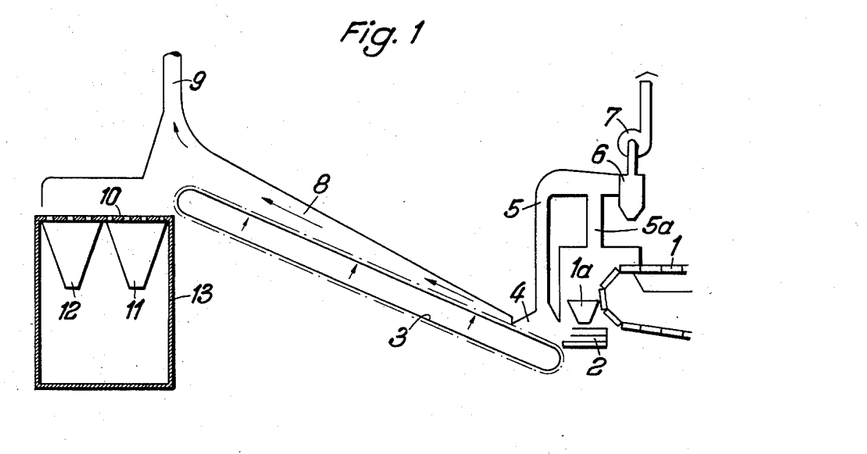
Figure 1 is a side elevational view of an inclined cooling conveyor.

In Figure 1, sintered or other hot agglomerate is taken as from a sinter machine 1, or from a rotary kiln, or a roasting oven etc. and discharged into hopper 1a from which it is fed over a stepped grate 2. As the material is passing over this grate, air is drawn through the grate and the material, and the material deposited on conveyor 3. A particularly strong suction can be formed at the loading end portion 4 of the conveyor in order to insure that the fines will be carried up the flue 5 into the dust separator 6, the suction being maintained by fan 7. The removal of the fines may be supplemented by a draft produced in conduit 5a mounted above hopper 1a.

The remainder of the conveyor is covered by a hood 8 which connects with stack 9. The depth of hot agglomerate on the conveyor is generally under 50 cm. The time to cool hot sintered material depends on the initial temperature as well as on the desired final temperature, and in the case of iron ore sinter cooled down to a temperature of less than 100 degrees C. is generally less than 25 minutes. The time needed for cooling determines the length of the conveyor and the velocity of the same.

The conveyor 3 has a louver-like bottom surface so that air passes upwardly through the conveyor and the hot agglomerate to cool the material. As the air thus absorbs heat, a natural draft is created through the stack 9, which draft is supplemented by a suction fan mounted in said stack. The heated air can be recovered from the stack 9 and utilized for other heating purposes. In order to facilitate the formation of a natural draft, the conveyor can be inclined so that it acts as an elevator for the material, and also a slight chimney effect is achieved beneath the hood 8.

At the discharge end of the conveyor 3, the material can be dumped with a low fall and scarcely any disintegration upon a moving belt conveyor, which may be composed of rubber as the material is sufficiently cooled. However, if it is desired to store the material, it is conveniently passed over a graduated grate or sieve 10 and sorted into various particle sizes, as from 0.0 to 7 cm.; 7.0 to 25 cm., and over 25 cm., the particles then being collected in hoppers 11 and 12 which are mounted in a suitable supporting structure 13.

Figures 2, 3:
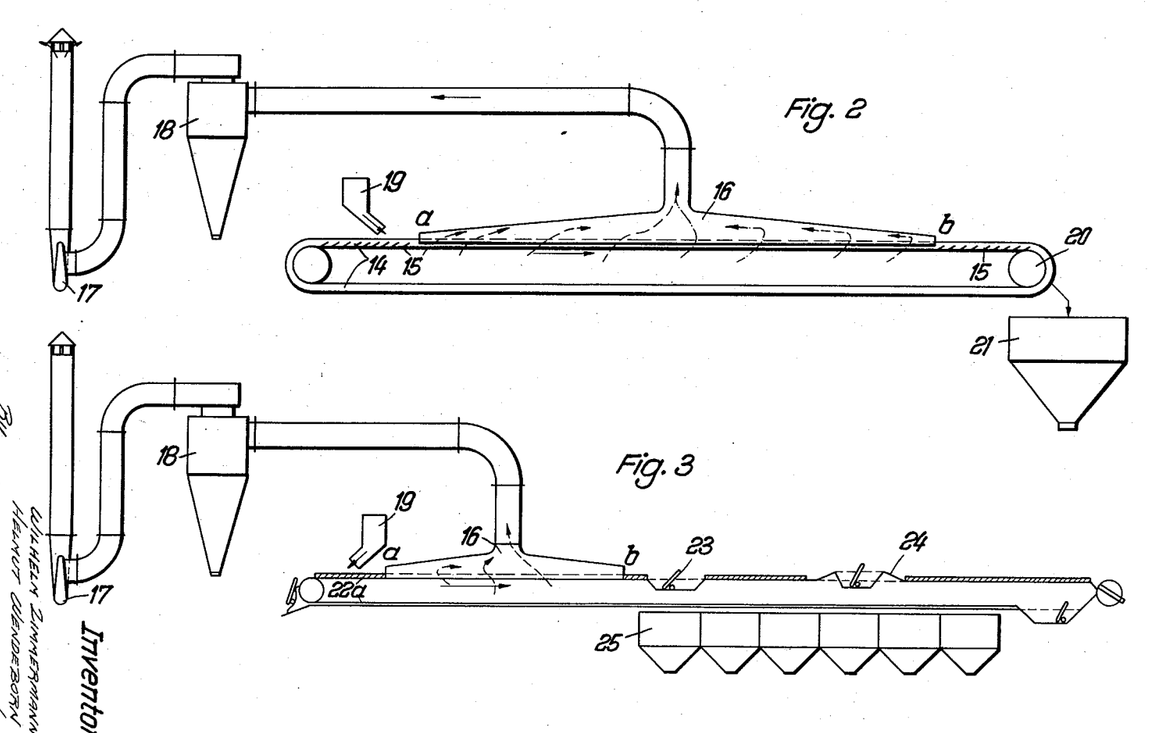
Figure 2 is a side elevational view of a horizontal cooling conveyor.
Figure 3 is a side elevational view of a modification of Figure 2.

The method and apparatus are further illustrated in the forms of the invention shown in Figures 2 and 3. In Figure 2, the conveyor 14 is constructed of a number of plate segments having louver-like slots 15 therein. The cooling path a—b is covered by a hood 16 in which a draft is induced by means of fan 17, the heated air passing through dust separator 18. Material is fed onto the conveyor from hopper 19 with the least possible drop and discharged from end 20 into hopper 21.

In Figure 3, the conveyor 22 is of the so-called drag and plate form. The material is fed onto the louver-like plates 22a through hopper 19. The individual plates after leaving the hood 16 can either be discharged into various hoppers 25 beneath the conveyor at track drop 23, or emptied into the same hoppers at any place by means of a raised discharging device 24.

The cooling of hot, sintered material at or near incandescent temperatures by air alone presents unusual problems in the construction of an apparatus which will permit the passage of sufficient volumes of air, and provides at least 100 percent supporting area in the bottom, and which is serviceable in handling hot, heavy materials.

Forms of a satisfactory apparatus are disclosed in Figures 4, 5, 6, and 7.

Figure 4:
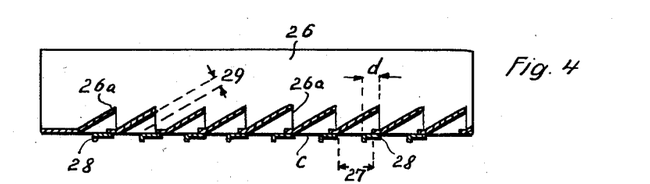
Figure 4 is a cross-sectional view through the louvered bottom of the conveyor.

The passage of large volumes of air requires a large area of openings in the conveyor pan, while at the same time these openings have to be such that dust or fines will not fall through the bottom of the pan. In Figure 4, the conveyor pan is composed of side walls 26 and a bottom. This bottom has a plurality of upwardly spaced and inclined flanges forming louvers extending transversely and substantially the entire width of the bottom. Each flange is inclined about 30° to the plane of the bottom and spaced from its adjacent flange so as to provide open areas comprising from 10 percent to 90 percent of the bottom surface area, while at the same time the solid supporting area constitutes 100 percent to 120 percent of the surface of the bottom. Specifically, the sum of the open areas and solid supporting areas is substantially higher than 100 percent of the plan of the bottom, and preferably higher than 120 percent. In Figure 4, and in the modifications shown in Figures 5 and 6 and 11 to 13, this sum amounts to at least 143 percent of the plan surface area of the bottom.

Figure 6:
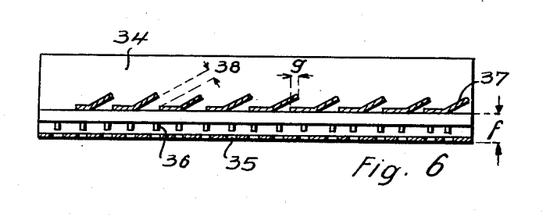

In Figure 4, each opening formed in the bottom is partially closed by an angle 28 welded to the bottom, each angle overlapping the edge of a louver 26a by a distance d. This is for the purpose of preventing the vertical fall through of small particles, while still maintaining a sufficient area of openings for the passage of large quantities of air. Thus the opening 27 has been reduced to a distance c, and the effective air passage opening reduced to a distance 29. Because of this, air can pass freely through the bottom but small particles of the hot, sintered material and dust cannot drop through the bottom, at least not to any significant degree. However, if a small amount of fall through dust is permissible, or is caught by a screen as later referred to in Figure 6, then the angles 28 can be discarded to give greater openings for the passage of air, the flanges being lapped as shown in Figure 6. The removal of the angles simply reduces the solid supporting areas from 120 percent to 100 percent, and increases the air passage by the same amount.

Figure 5:
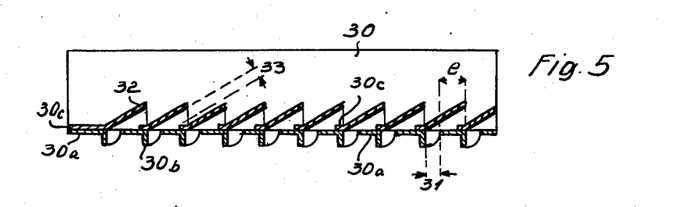
Figures 5, 6 and 6a, respectively, are modified louvered bottoms.

In Figure 5, the conveyor pan has side walls 30 and a bottom 30a with its sides and flanges 30b bent downward at right angles to form louver-like openings. The fall through area of the openings is reduced to a negative value by a plate 30c, which is slotted and has flanges struck upwardly to form louvers 32 in the same sense as the louvers 26a in Figure 4. Plate 30c is arranged to lap over openings 31 so that the flanges of louvers 32 will lap the bottom by a distance e. Consequently, the fall through area e is negative, while the free air passage has the distance 33 which extends substantially entirely across the bottom.

In Figure 6, the conveyor pan has side walls 34 and a double bottom. The real bottom 35 can be perforated for the passage of air therethrough, but is preferably air impervious. The necessary air inlet is provided by slot-like openings 36 in the side walls 34, so that sufficient air can be drawn in, while any particles falling through will be caught by the real bottom 35. Immediately above the slots 36, strips are welded to the side walls 34 to form supports for transversely extending obtuse angle members 37. The upper edge of the flange of each angle 37 laps the lower edge of an adjacent angle by a distance g in order to form an air passage opening having a distance 38 and simultaneously negativing the fall through through area. The angles 37 thus form a second bottom spaced a distance f above the bottom 35. In this form of the invention, the bottom 35 can have such small openings as to catch any dust or fines which, by chance, may fall through openings 38.

Figure 6A:
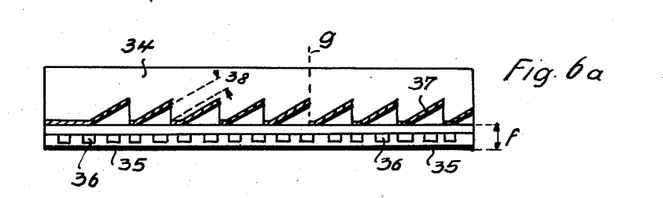

By far the simplest and still fully operative construction is shown in Figure 6a. The bottom is formed of separate strips of metal sheet, whose horizontal ends are screwed or otherwise attached to a frame and whose inner parts are torqued in such a way as to form the inclined members of the louvers.

Figure 7:
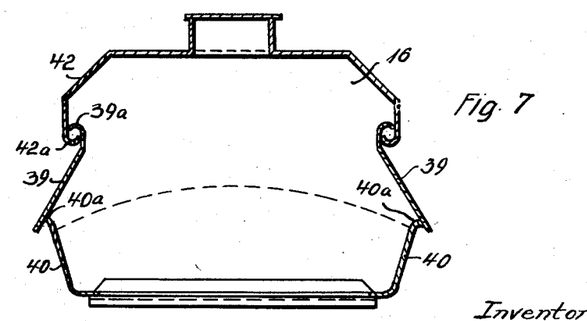
Figure 7 is a transverse cross-sectional view through the conveyor and hood therefor.

It is desirable to have the hood fit as tightly as possible with the conveyor sections so that an effective suction can be maintained under the hood. Figure 7 shows a construction which is adaptable to the hood and conveyor sections used in the apparatus of Figures 1 to 3, and the individual sections of Figures 4, 5, and 6. The conveyor section has side walls 40 with outwardly bent upper edges 40a. The hood 42 is provided with lower inwardly or outwardly turned flanges 42a in which plates 39 bent on their upper edges 39a are suspended. Thus, as the conveyor section passes beneath hood 42, a sliding contact is maintained between the suspended plates and the upper edges 40a of the walls 40 in such a manner as to be airtight for all practical purposes.

The elimination of the dust fines as shown in the conveyor in Figure 1 can be applied to the modification forms of the invention illustrated in Figures 2 and 3. Furthermore, the conveyors of Figures 2 and 3 may be inclined as illustrated in Figure 1. This has the advantage in that a better natural draft is obtained through the conveyor bottom and is particularly suitable for the cooling of iron ore sinters because in most iron melting plants the cooled sinter must be elevated to the top of the plant for further processing.

Figure 8:
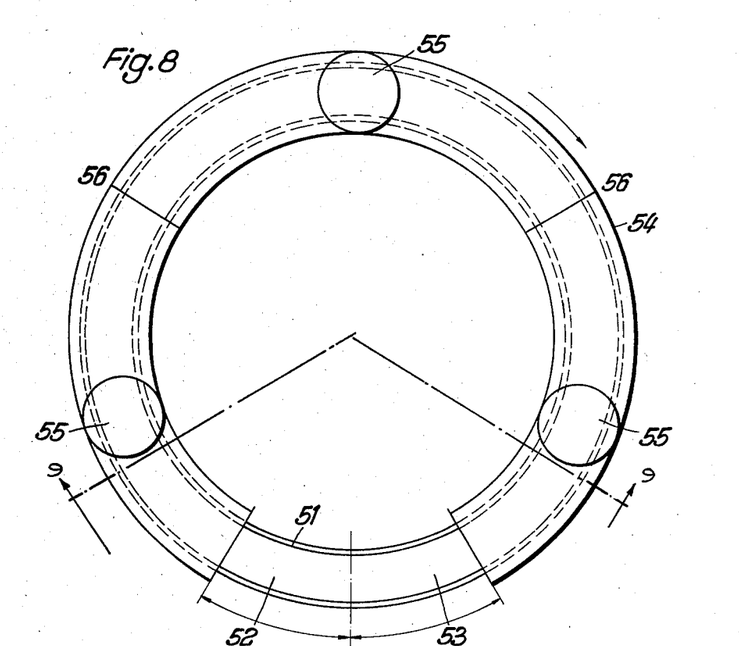
Figure 8 is a plane view of a circular cooler.

The circular cooling conveyor shown in Figures 8 to 13, inclusive, has the advantage of compactness and a saving of floor space. In addition, the circular construction has no unloaded side as in the case of a straight belt conveyor, so that almost the entire surface is used for holding the hot, lumpy material being cooled. In Figure 8, the endless circular band 51 rotates through a loading zone 52, turning in the direction of the arrow, so that the cooled material is removed from the band in the adjacent discharge zone 53. Zones 52 and 53 are uncovered, whereas the remainder of the circular path is covered by a hood 54. Air is drawn up through the conveyor and the material thereon with the aid of flues 55, in which are mounted suction fans 55a. The suction space allocated to each individual flue 55 can be varied in accordance with the gas volumes drawn off by means of partitions 56.

Figure 9:
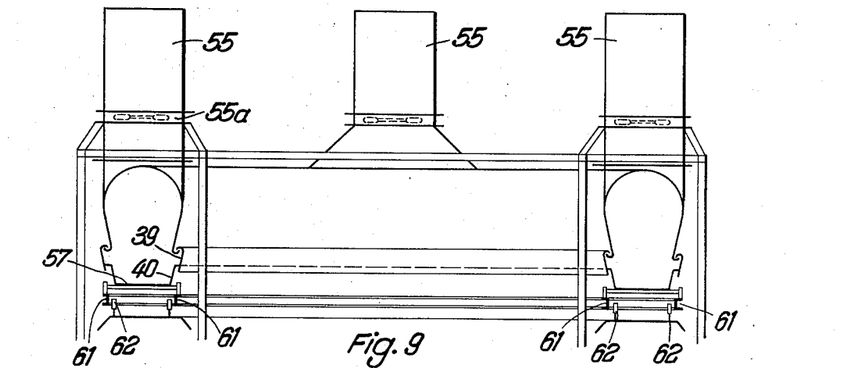
Figure 9 is a cross-sectional view along the line 9—9 of Figure 8.

The trough pans 57, indicated in Figure 9, forming the circular conveyor are constructed substantially as described for Figures 4 to 7, or 10 to 13, and again produce a bottom for each pan in which the sum of the solid supporting area and the air opening area is substantially higher than 100 percent.

Figure 11:
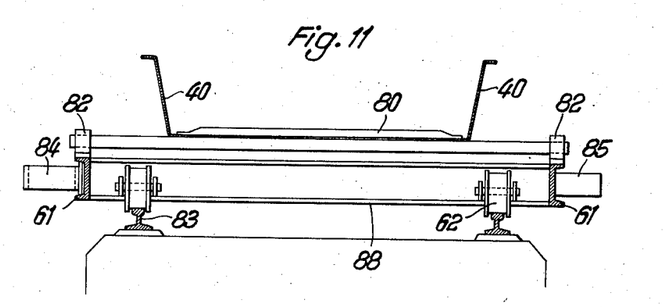
Figure 11 is a transverse cross-sectional view showing the support for the cooling conveyor and giving an enlarged detail of Figure 9.
Figure 12:
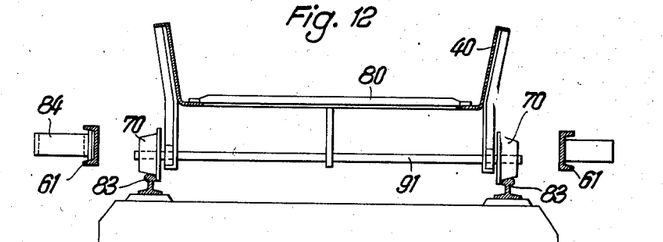
Figure 12 is a similar view showing the support of the conveying trough plates on their tracks.
Figure 13:
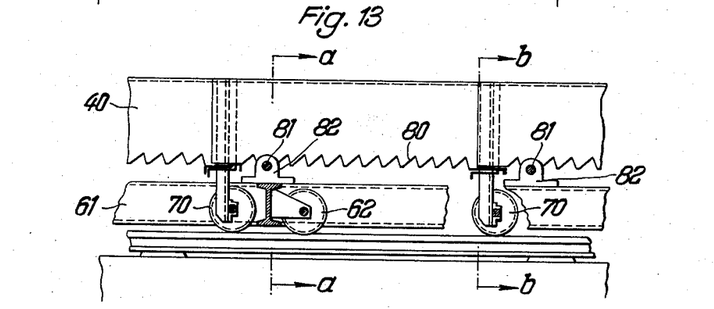
Figure 13 is a longitudinal cross-sectional view through the conveying troughs and supporting rails.

The individual pans are carried by a pair of spaced circular rigid and co-rotating rings 61 which in turn are supported on rails 83. The rings 61 serve not only as a support, but also transmit the rotary motion from a drive 84 as shown in Figures 11 to 13. Plates 39 again produce a seal between the moving cooling band and the stationary hood.

Figure 10:
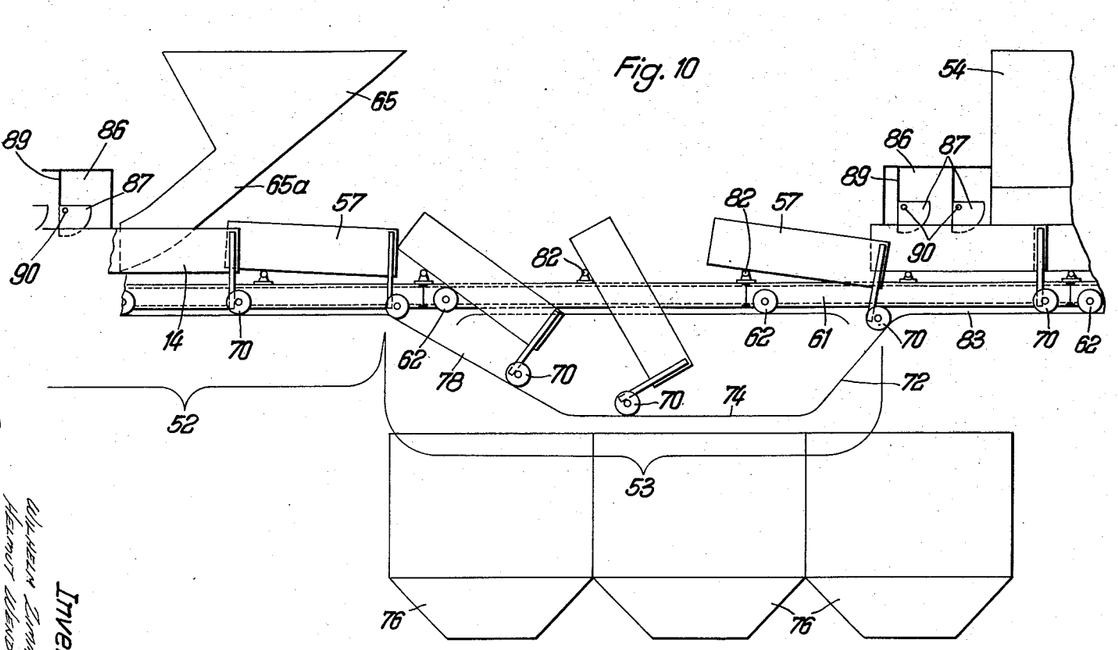
Figure 10 is a side view of the charging and unloading zones of Figure 8.

As shown in Figure 10, a chute 65 is mounted above the uncovered open loading zone 52. The lower outlet end 65a of this chute is placed as closely as possible and within a few centimeters above the bottoms of pans 57. By so doing, the height of fall of the hot, lumpy materials is kept to a minimum in order to avoid pulverizing and dusting. Each pan 57 holds the material at rest while it is being cooled by air passing therethrough. As the pans circulate, they come beneath the hood, and cooling air is drawn through the sintered material, the air seal being maintained by means of the flaps or flanges 39, and the air being exhausted through the exhaust stacks 55. Then at the discharge zone 53, the pans emerge into the open from under the hood 54. Each trough plate 57 is provided with wheels 70 which ride down the incline 72 of the track, onto the horizontal track portion 74, the pan being thus tilted to dump the material into hoppers 76, or onto a moving belt. The material slides out of the pans 57 and falls only a short distance as, for example, less than one-half a meter, so that again the material is not pulverized nor broken up to any appreciable degree. Then the wheels 70 are raised by the upwardly inclined track section 78 and the pans brought immediately into the loading zone 52. The uncovered zones 52 and 53 permit the material to be loaded and dumped from the pans with minimum handling. In order to avoid air being drawn in from the hood 54 through the entrance and exit points of the conveyor, such entrance and exit points are sealed off by airlocks 86. The simplest type of such airlock is formed by a chain or rod curtain consisting of chains or rods hung closely side by side.

Figure 14:
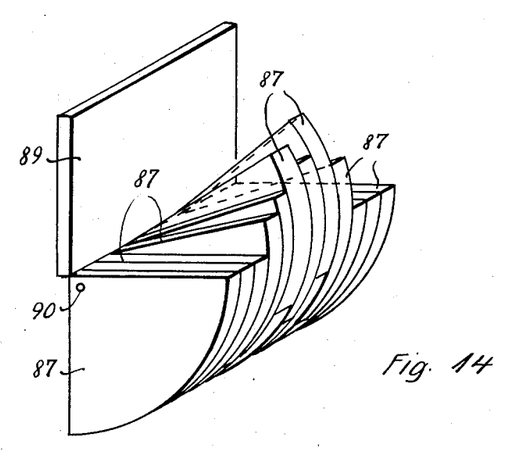
Figure 14 is a perspective view of an airlock used in the hood over the sinter conveyor.

Figure 14 shows a preferred type of airlock consisting of discs 87 in the shape of circular segments hung closely side by side from a revolving suspension in such a manner, that the lumpy charge to be cooled lifts the individual discs only to such an extent as is necessary for allowing the pan to pass which carries the charge. Such discs are advantageously arranged in four consecutive series. Of course, the space above the disc series is shut off gastight by means of rigid walls 89. The above construction is especially useful for maintaining high pressure differences between the hood and the outside. As it was found that a pressure gradient of about 50 mm. water column is necessary for driving the large amounts of air required for cooling through the charge and the apparatus, the above type of airlock is preferably used in actual practice.

Figures 11 to 13 show details of the pans and the tracks. The pans 57 have side walls 40 and a louvered bottom, such as shown in Figures 4 to 7, with the louvers 80 extending substantially entirely across the bottom of each pan and with the sum of the solid and open areas constituting substantially more than 100 percent of the plan area of the bottom. One end of each pan is pivotally supported by a shaft 81 journaled in bearings 82 attached to the pair of circular rings 61, whereupon the pans are moved around the circle. This is accomplished by means of wheels 62 carrying rings 61 and riding upon tracks 83. The pairs of rings 61 are driven by gear 84. The opposite side of the ring is held in place by counterpressure roller 85. The opposite end of each pan is carried by an axle 91 having wheels 70 riding on the same tracks 83, as wheels 62. Tracks 83 have the downwardly and upwardly inclined sections 72 and 78 for the purpose of tilting the pans. When the pans are in a horizontal position, they have their ends telescoped as shown in Figures 10 to 13.

In operation, in, for example, the cooling of hot agglomerated iron ore sinter, the material is dropped from a sinter pan or a sinter band through chute 65 into each pan 57, the material being at a temperature of approximately 800 degrees C., and piled to a depth of about 40 centimeters. Air at atmospheric temperature is drawn through the material at the rate of 100 cubic meters per square meter and minute. Each pan is about 1.2 meter long and 1.5 meter wide. The diameter of the circular apparatus is about 13 meters. The pans are moved in one direction only, the material being at rest thereon, the round trip for each pan being about twenty minutes. This apparatus produces 1680 tons per twenty-four hour day of sinter cooled to a temperature of about 70 degrees C. As in the cooling of about all sintered material, there is no danger of the material breaking up by thermal stresses when it is at a temperature below 200 degrees C. There is no detrimental crushing of the sinter. The amount of dust falling through the louvered bottom is very small.

The cooling apparatus described has the advantages of mechanically protecting the material during cooling inasmuch as it is only moved small distances between loading and dumping and remains at rest in the pans while undergoing thermal stresses during cooling. Therefore, thermal and mechanical stresses cannot occur at the same time. The louvered bottom permits the exclusive cooling by air due to the construction permitting the maximum passage of air, and yet prevents fine particles and dust from falling through the bottom in any appreciable degree. The quantity of air drawn through the pans can be varied for different conditions. Moreover, the apparatus is rugged, has a low maintenance cost, and needs little power for operation.

This application is a continuation-in-part of our co-pending application Zimmermann and Wendeborn Serial No. 281,244, filed April 8, 1952, for "Cooling of Hot Materials," now forfeited, and Wendeborn and Zimmermann Serial No. 345,356, filed March 30, 1953, for "Apparatus for Cooling Material in Lump Form," now abandoned.

Having now described the means by which the objects of the invention are obtained,

We claim:

1. An apparatus for cooling hot lumpy material, comprising an apertured conveyor adapted to receive and carry hot material, said conveyor further comprising a plurality of trough sections, flanges projecting at an angle to the plane of the bottom of each section to form a louver-like bottom, means for closing a portion of the opening between adjacent flanges, means for inducing a cooling gas to rise through the apertures in the bottom and through said material, and means for pneumatically removing fines from said material immediately in advance of the loading end of the conveyor.

2. A unit adapted to be linked with adjacent similar units to form a conveyor, comprising a trough having side walls and a louvered-like bottom, said bottom having flanges struck therefrom, and angle bars extended across a portion of the opening in the bottom between adjacent flanges.

3. A unit as in claim 2, said flanges being struck upwardly from said bottom.

4. A unit as in claim 3, said bottom comprising flanges struck downwardly at right angles to said bottom, and a louvered cover plate partially covering the openings in said bottom between adjacent flanges.

5. An apparatus for the cooling of hot sintered material comprising a conveyor composed of a plurality of articulated connected pans each having gas impervious side walls and a louvered bottom with the louvers extending substantially across the entire width of the pan and forming air openings in said bottom constituting at least 10 percent of the bottom surface area, a hood mounted above said pans in sliding gas sealed contact therewith, and means for forcing cooling air upwardly through the louvered bottoms into said hood to be exhausted therefrom.

6. An apparatus for cooling hot, lumpy sintered material comprising a conveyor having a louvered bottom composed of flanges projecting at an angle to the plane of the bottom, means for inducing a cooling gas to pass through the bottom and the material thereon, and angle bars extending across a portion of the opening between adjacent flanges for closing a portion of the opening between adjacent flanges.

7. A trough pan linkable with like pans to form an endless conveyor comprising a pan having air impervious side walls, and a pan bottom composed of flat portions lying in the plane of the bottom, and angled portions inclined with respect to the plane of the bottom constituting louvers extending substantially entirely between said side walls and forming air openings amounting to at least 10 percent of the bottom surface area.

8. A trough pan as in claim 7, said angled portions being integral with said flat portions.

9. A trough pan as in claim 8, further comprising angle bars extending across a portion of the opening between adjacent flat portions for closing a portion of said opening.

10. A trough pan as in claim 7, said angled portions being inclined about 30° with respect to the plane of the bottom.

11. An apparatus as in claim 5, further comprising a circular conveyor, with said hood leaving a portion of said conveyor uncovered, means for rotating said conveyor, means for loading hot material into said pans at said uncovered portion, and means for unloading said conveyor at another part of said uncovered portion.

References Cited in the file of this patent

UNITED STATES PATENTS

| | | |
|---|---|---|
| 620,139 | Hysore | Feb. 28, 1899 |
| 1,633,548 | Jones | June 21, 1927 |
| 2,041,142 | Norvig | May 19, 1936 |
| 2,094,786 | Flint | Oct. 5, 1937 |
| 2,256,017 | Curran | Sept. 16, 1941 |
| 2,367,174 | Renkin | Jan. 9, 1945 |
| 2,441,383 | Babb | May 11, 1948 |
| 2,669,032 | Zimmerman | Feb. 16, 1954 |